United States Patent [19]
Fujikawa et al.

[11] Patent Number: 5,892,448
[45] Date of Patent: Apr. 6, 1999

[54] ELECTRONIC CLINICAL THERMOMETER

[75] Inventors: Toyoharu Fujikawa; Shingo Ichikawa, both of Tanashi, Japan

[73] Assignee: Citizen Watch Co., Ltd., Tokyo, Japan

[21] Appl. No.: 722,223

[22] PCT Filed: Oct. 31, 1995

[86] PCT No.: PCT/JP95/02228

§ 371 Date: Oct. 23, 1996

§ 102(e) Date: Oct. 23, 1996

[87] PCT Pub. No.: WO97/16710

PCT Pub. Date: May 9, 1997

[51] Int. Cl.[6] .................................................... G01K 7/00
[52] U.S. Cl. ..................... 340/584; 340/692; 374/163; 374/167; 73/171
[58] Field of Search .................................. 340/584, 692, 340/636, 693, 384.6, 870.17, 581, 589, 588; 73/170.2, 170.21, 172, 170.22, 171, 490, 865.1, 866.3, 19.12, 864.55; 374/110, 111, 112, 169, 163; 116/216; 128/736

[56] References Cited

U.S. PATENT DOCUMENTS

| 4,541,734 | 9/1985 | Ishizaka | 374/169 |
| 4,574,359 | 3/1986 | Ishizaka | 364/557 |
| 4,592,000 | 5/1986 | Ishizaka | 364/557 |
| 4,629,336 | 12/1986 | Ishizaka | 374/169 |
| 4,648,055 | 3/1987 | Ishizaka | 364/557 |
| 5,626,425 | 5/1997 | Fujikawa et al. | 374/163 |

FOREIGN PATENT DOCUMENTS

| 58-211610 | 12/1983 | Japan . |
| 59-128536 | 8/1984 | Japan . |
| 59-135441 | 9/1984 | Japan . |
| 60-220832 | 11/1985 | Japan . |
| 61-102836 | 6/1986 | Japan . |

OTHER PUBLICATIONS

International Search Report.

Primary Examiner—Jeffery A. Hofsass
Assistant Examiner—Davetta Woods
Attorney, Agent, or Firm—Dennison, Meserole, Pollack & Scheiner

[57] ABSTRACT

The electronic clinical thermometer of the present invention has a temperature sensing portion (3), a control signal generating circuit (2) for generating a control signal for controlling operation of each of structural elements, a converting circuit (4) for converting an output signal generated from the temperature sensing portion into a digital signal, a temperature measuring section (6) for measuring the temperature based on the digital signal, storage circuits (7) for storing and updating a maximum value of the temperature measured by the temperature measuring section in order. Data comparing circuits (8) are provided for comparing the temperature stored in the storage circuits with a present measured value. Temperature rise detecting means (21) is provided for detecting a rising amount of the temperature based on a compared result of the data comparing circuits, and a buzzer (103) is provided for informing the rise of the temperature based on a signal of the temperature rise detecting means. The temperature rise detecting means has a temperature change determining circuit (12) for generating a determining signal responsive to a temperature rising rate. The temperature change determining circuit is formed such that a period of the determining signal is changed in accordance with a temperature rising rate. Therefore, the period of the informing sound changes in accordance with the temperature change.

18 Claims, 7 Drawing Sheets

ELECTRONIC CLINICAL THERMOMETER

TECHNICAL FIELD

The present invention relates to an electronic clinical thermometer, and more particularly to an electronic clinical thermometer which is improved so as to inform that temperature of a user is in process of being-measured in a normal state.

BACKGROUND ART

Recently, an electronic clinical thermometer is practically used in place of a mercury thermometer. The electronic clinical thermometer mainly has a pencil shaped configuration, similar to the mercury thermometer. In the pencil-shaped electronic clinical thermometer, a measuring place of the human body is either under a tongue or an armpit. In either case, when the temperature is measured, the user can not look at a temperature display. Therefore, when a predetermined measuring time has passed, the electronic clinical thermometer is picked out of the measuring place so as to confirm the display. However, if a sensor head of the electronic clinical thermometer is not correctly held in the measuring place, the measurement ends in failure. Therefore, the temperature must repeatedly be measured.

Furthermore, the problems arise in the conventional electronic clinical thermometer that the user can not know whether the number indicating the temperature increases during the measurement or not, and the thermometer is in a normal state (for example, the sensor head of the electronic clinical thermometer is held in the predetermined place). Since the fact that the displayed temperature stops rising means the finishing of the measurement, the information is desirable.

In order to solve the above mentioned problems, there has been proposed an electronic clinical thermometer having a temperature calculating circuit, a data holding circuit for holding a present data obtained by the temperature calculating circuit, a comparing circuit for comparing the present data held in the data holding circuit with a newly obtained data by the temperature calculating circuit, and updating means for updating the old data with the new data. Displayed temperature data rise detecting means is provided for detecting the rise of the displayed temperature information in accordance with the updating, and for producing a temperature data rise signal. In accordance with the temperature data rise signal, sound generating means emits sounds at a constant interval to inform that the displayed temperature information is rising, and the thermometer is correctly used to the user.

Thus, in the conventional electronic clinical thermometer, since the rise of displayed temperature information is informed by the constant interval sounds, it is possible to inform to the user that the electronic clinical thermometer is correctly used during measurement. However, an elapsed time of the measurement is not informed. The elapsed time is another desirable information, because the user wants to know the present point of time in the measuring period from the beginning to end of the measurement.

In order to solve the above described problems, an object of the present invention is to provide an electronic clinical thermometer in which the user can know an elapsed time of the measurement in addition to information of displayed temperature information rising during measurement and correct use of the electronic clinical thermometer.

DISCLOSURE OF THE INVENTION

The electronic clinical thermometer according to the present invention is characterized by a temperature sensing portion, a control signal generating circuit for generating a control signal for controlling operation of each of structural elements, a converting circuit for converting an output signal generated from the temperature sensing portion into a digital signal, a temperature measuring section for measuring the temperature based on the digital signal, storage circuits for storing and updating a maximum value of the temperature measured by the temperature measuring section in order, a display for displaying the temperature stored in the storage circuits, data comparing circuits for comparing the temperature stored in the storage circuits with a present measured value, temperature rise detecting means for detecting a rising amount of the temperature based on a compared result of the data comparing circuits, a buzzer driving circuit operated based on a signal of the temperature rise detecting means, informing means operated by the buzzer driving circuit for informing the rise of the temperature by generating an informing sound, wherein the temperature rise detecting means has a temperature change determining circuit for generating a determining signal responsive to a temperature rising rate, whereby the buzzer driving circuit operates to change a period of the informing sound in accordance with the temperature change.

The temperature change determining circuit generates the determining signal when a predetermined constant rise of the temperature is detected.

BEST MODE FOR EMBODYING THE INVENTION

Figure 7:
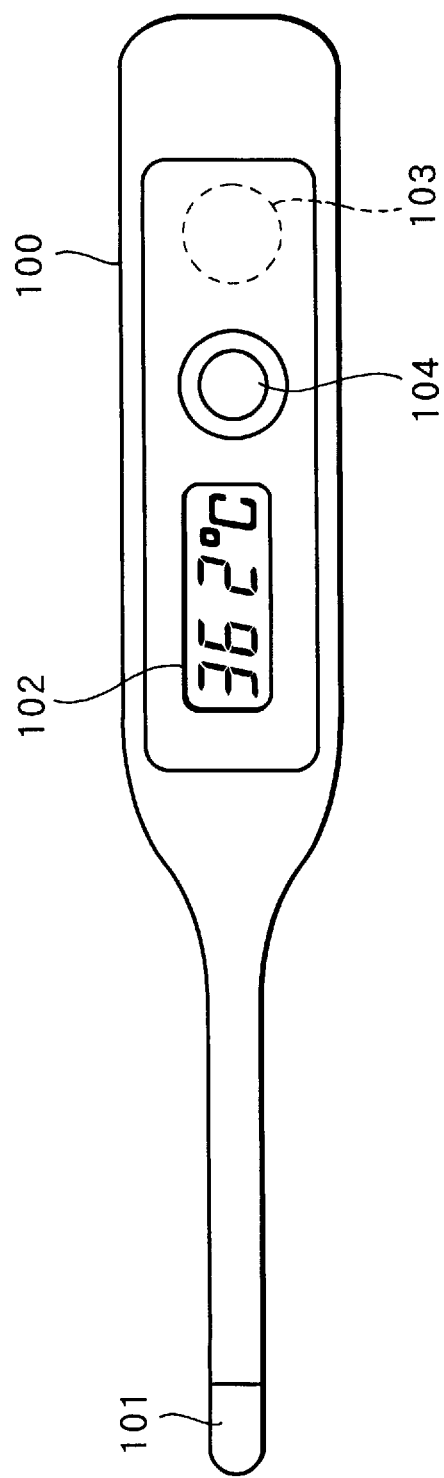
FIG. 7 is a perspective view showing the electronic clinical thermometer of the present invention.

Referring to FIG. 7 showing an electronic clinical thermometer of the present invention, the electronic clinical thermometer 100 comprises a sensor head 101 at an end portion, a display 102, a buzzer 103, and an electric power switch 104 in a body portion.

Figure 1:
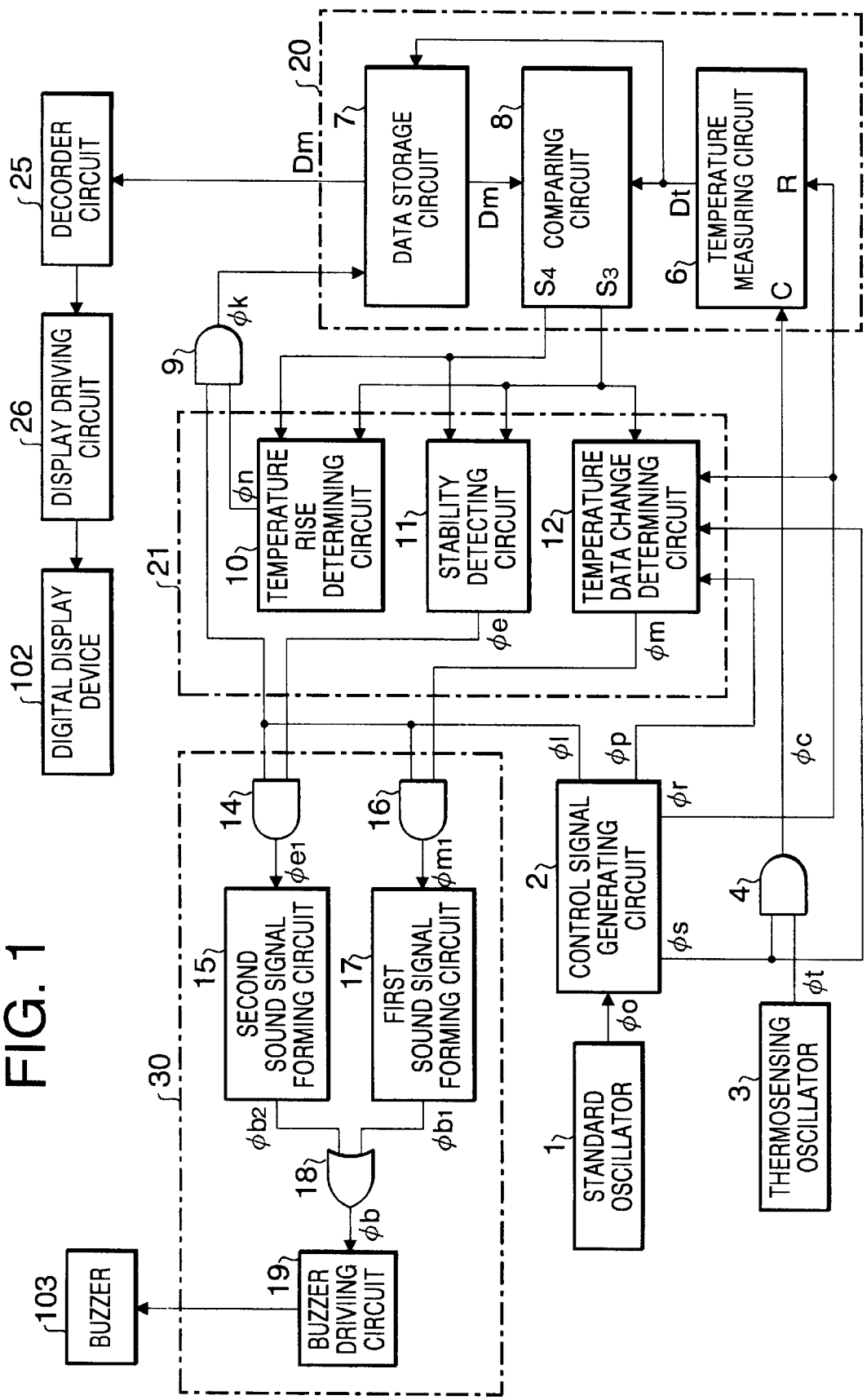
FIG. 1 is a block diagram showing an electronic clinical thermometer according to the present invention.

FIG. 1 shows a block diagram of a system of the electronic clinical thermometer 100. A standard oscillator 1 applies a standard signal ø0 to a control signal generating circuit 2. The control signal generating circuit 2 generates a reset signal ør, a sampling signal øs, a lead signal øp, and a latch signal øl which are shown by (B), (C), (D), (E) of FIG. 2, respectively. A thermo-sensing oscillator 3 has a thermo-sensing element and generates a thermo-sensing signal øt the oscillating frequency of which changes in accordance with the change of temperature.

The system has a present maximum temperature data holding device 20 for holding a present maximum value of the measured temperature in a period from the beginning of measurement. The holding device 20 comprises a temperature measuring circuit 6, a data storage circuit 7, and a comparing circuit 8. The system further has a measured temperature rise detecting device 21 comprising a temperature rise determining circuit 10, a stability detecting circuit 11, and a temperature data change determining circuit 12.

Figure 2:
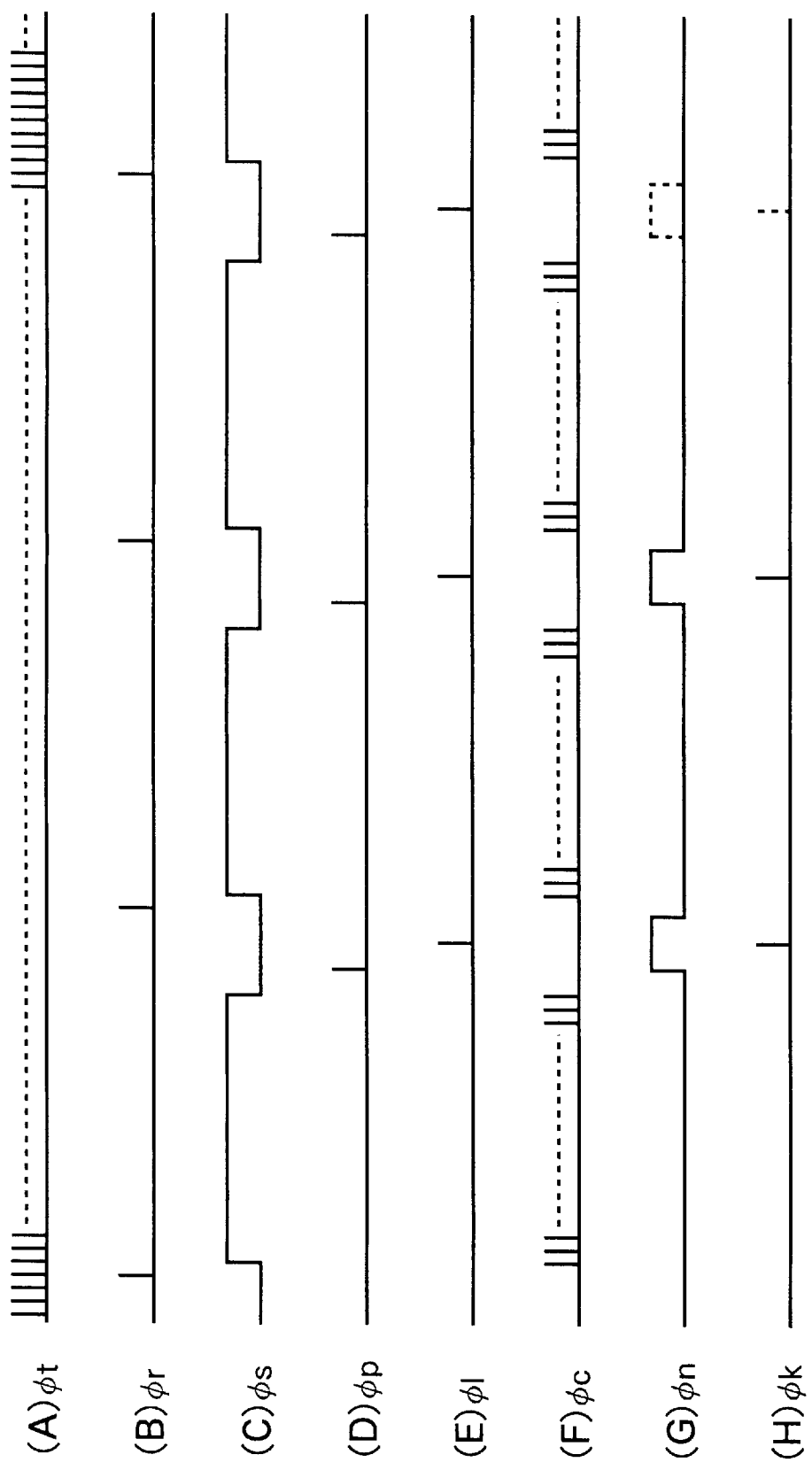
FIG. 2 is a diagram showing waveforms of a main part of the electronic clinical thermometer of FIG. 1.

An AND gate 4 for sampling the thermo-sensing signal øt is applied with the sampling signal øs from the control signal generating circuit 2 to one of input terminals, and applied with the thermo-sensing signal øt from the thermo-sensing oscillator circuit 3 at the other input terminal, thereby to generate a count signal øc as shown by waveforms (C), (A), (F) of FIG. 2. The count signal øc is applied to the temperature measuring circuit 6 of the present maximum temperature data holding device 20. The temperature measuring circuit 6 is initialized by the reset signal ør from the control signal generating circuit 2. The temperature measuring circuit 6 counts the number of count signals øc applied from the AND gate 4 during one sampling signal øs and generates a counted data which is applied to the data storage circuit 7 and the comparing circuit 8 as a temperature data signal Dt. The data storage circuit 7 stores a present maximum value Dm of the temperature data signal Dt. The comparing circuit 8 compares the present maximum value Dm of the temperature data signal which has last been stored in the data storage circuit 7 with a new temperature data signal Dt as a newly measured data of the temperature measuring circuit 6. The temperature data signal Dt is data of four digits. When the comparing circuit 8 detects the coincidence of higher three digits of the maximum value Dm and the data signal Dt, a first coincidence signal S3 is generated. When the comparing circuit 8 detects the coincidence of a lower one digit, a second coincidence signal S4 is generated.

The temperature rise determining circuit 10 is applied with first and second coincidence signals S3 and S4 from the comparing circuit 8. When the temperature rise determining circuit 10 determines a condition of Dt>Dm in accordance with a first coincidence signal S3a which will be described hereinafter, a temperature rising signal øn is generated as shown by (G) of FIG. 2 so that an AND gate 9 is opened. As a result, the latch signal øl from the control signal generating circuit 2 passes through the AND gate 9, and is applied to the data storage circuit 7 as an updating signal øk shown by (H) of FIG. 2. Thus, the new temperature data signal Dt from the temperature measuring circuit 6 is written in the data storage circuit 7 as the present maximum value Dm. The stability detecting circuit 11 is applied with the first and second coincidence signals S3 and S4 from the comparing circuit 8. When the stability detecting circuit 11 detects that a condition of Dt=Dm continues predetermined times (for example, five times), a stability detecting signal øe is generated. The temperature data change determining circuit 12 is applied with the first coincidence signal S3 from the comparing circuit 8. When the temperature data change determining circuit 12 determines that the temperature rises predetermined degrees (for example, 0.1° C.), a temperature data change determining signal øm is generated.

The present maximum value Dm of the temperature data signal from the data storage circuit 7 is applied to a decoder circuit 25 to be decoded to a pattern. The decoder circuit 25 applies an output signal to a display driving circuit 26 so that the digital display device 102 is driven.

An AND gate 14 for detecting the stable state passes the latch signal øl when the stability detecting signal øe is applied thereto, and applies a stability trigger signal øe1 to a second sound signal forming circuit 15. Thus, the sound signal forming circuit 15 generates a stability informing sound signal øb2.

An AND gate 16 for detecting the temperature data changing state passes the latch signal øl when the temperature data change determining signal øm is applied thereto, and applies a temperature data change trigger signal øm1 to a first sound signal forming circuit 17. Thus, the sound signal forming circuit 17 generates a temperature data change informing sound signal øb1. Although the sound signal forming circuits 15 and 17 are operated by the latch signal øl passed through the respective AND gates 14 and 16, the latch signal is also served as a synchronizing signal. An OR gate 18 is applied with the temperature data change informing sound signal øb1 and the stability informing sound signal øb2, and generates an informing signal øb. A buzzer driving circuit 19 is applied with the informing signal øb for driving the buzzer 103 so that an informing sound is generated. In the system, AND gates 14, 16, sound signal forming circuits 15, 17, OR gate 18, buzzer driving circuit 19 compose a buzzer driving device 30.

Figure 3:
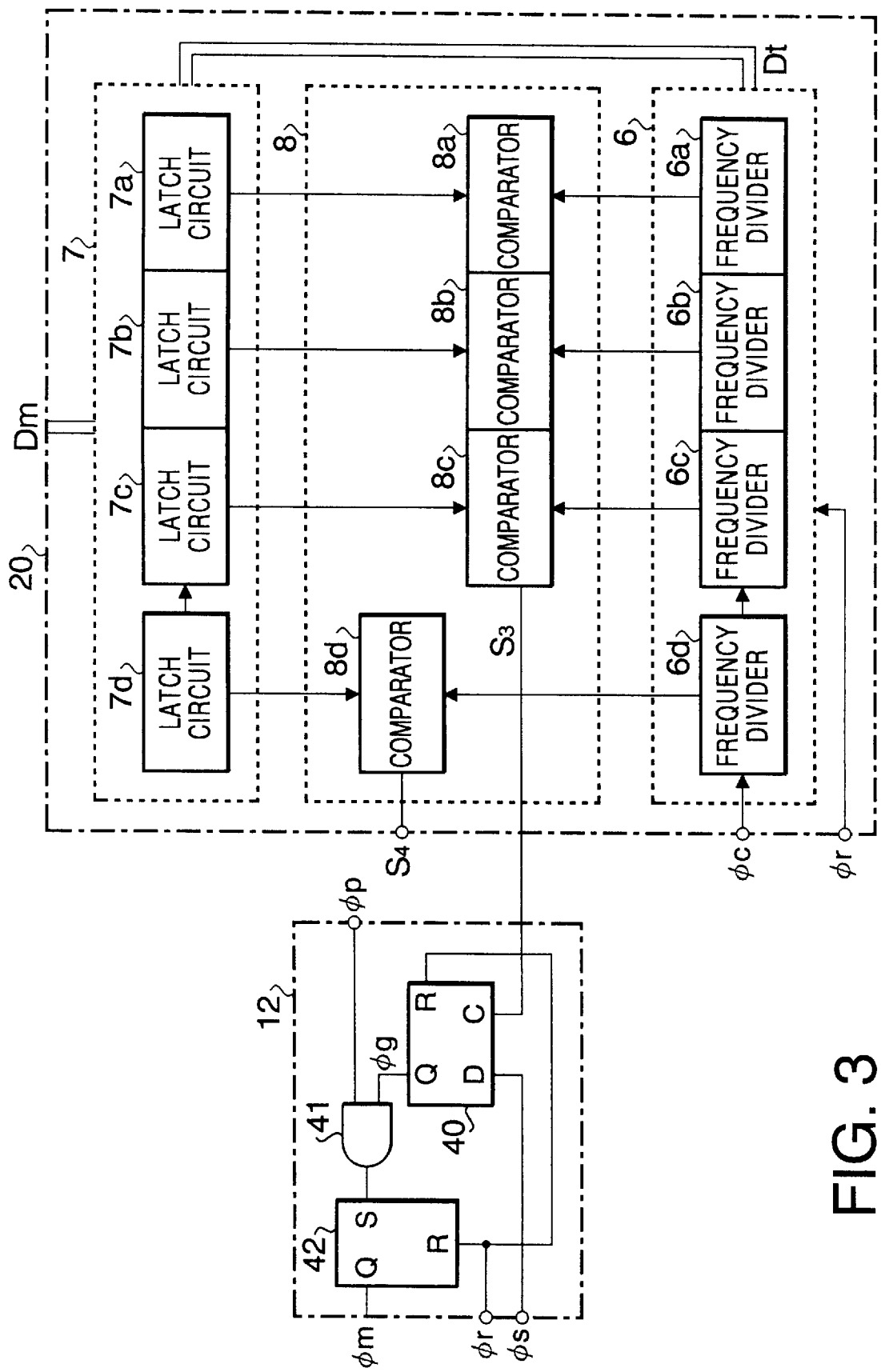
FIG. 3 is a block diagram showing a present maximum temperature data holding device and a temperature data change determining circuit of FIG. 1.

FIG. 3 shows a block diagram of the maximum temperature data holding device 20 and the temperature data change determining circuit 12. The temperature measuring circuit 6 comprises four 1/10 frequency dividers 6a, 6b, 6c and 6d which are connected in series. Each of the frequency dividers has a counter. The frequency divider 6a is operated to count a unit of 10 degrees, the frequency divider 6b counts a unit of 1 degrees, the frequency divider 6c counts a unit of 0.1 degrees, and the frequency divider 6d counts a unit of 0.01 degrees. The data storage circuit 7 comprises four latch circuits 7a, 7b, 7c and 7d corresponding to the temperature measuring circuit 6. The comparing circuit 8 comprises four comparators 8a, 8b, 8c and 8d. The comparing circuit 8 generates the first coincidence signal S3 by three comparators 8a, 8b, 8c and the second coincidence signal S4 by the comparator 8d. The temperature measuring circuit 6 counts the count signal øc which is applied to the comparator 8d and transferred to the frequency dividers 6c, 6b and 6a in order, so that the temperature data signal Dt is produced. If the frequency divider 6a counts "3", frequency divider 6b counts "7", frequency divider 6c counts "0", and frequency divider 6d counts "0", the temperature information of 37.00° C. is informed. The data storage circuit 7 stores the temperature information transmitted from the temperature measuring circuit 6 with a method, which will be described hereinafter.

Describing more in detail, the latch circuits 7a to 7d of the data storage circuit 7 are formed such that the data of the frequency divider 6a is stored in the latch circuit 7a, the data of the frequency divider 6b is stored in the latch circuit 7b, the data of the frequency divider 6c is stored in the latch circuit 7c, and the data of the frequency divider 6d is stored in the latch circuit 7d. Furthermore, the comparing circuit 8 comprises a first comparing section having three comparators 8a to 8c in which the data of frequency dividers 6a to 6c of the temperature measuring circuit 6 representing higher three digits are compared with the data of the latch circuits 7a to 7c of the data storage circuit 7 for generating the first coincidence signal S3, and a second comparing section having the comparator 8d in which the data of frequency divider 6d of the temperature measuring circuit 6 representing the lower digit is compared with the data of the latch circuit 7d of the data storage circuit 7 representing the lower digit for generating the second coincidence signal S4.

The temperature data change determining device 12 comprises a data type flip-flop 40 (hereinafter abbreviated to D-FF) applied with the sampling signal øs as a data signal, the first coincidence signal S3 as a clock signal, and the reset signal ør as a reset signal, an AND gate 41, and an R-S flip-flop 42 (hereinafter abbreviated to RS-FF).

Operations of the present maximum temperature data holding device 20 and temperature data change determining circuit 12 will be described with reference to FIG. 4. First, the operation of the present maximum temperature data holding device 20 will be described. As aforementioned, the temperature measuring circuit 6 counts the count signal øc applied to the frequency divider 6d and performs the carry to the frequency dividers 6c, 6b, 6a in order for producing the temperature data. During the counting operation, since the content of the frequency divider 6d is equal to the content of the latch circuit 7d at every output of the frequency divider 6d of 0.01 degree, the comparator 8d generates the second coincidence signal S4 of the lower digit at every output of the frequency divider 6d. The temperature measuring circuit 6 continues the counting operation, and then the content of the frequency divider 6a becomes equal to the content of the latch circuit 7a. Thereafter, the temperature data at the frequency divider 6b becomes equal to the content of the latch circuit 7b. Finally, the temperature data at the frequency divider 6c becomes equal to the content of the latch circuit 7c. Then, the first comparing section having three comparators 8a, 8b, 8c generates the first coincidence signal S3 of the higher digits which is applied to a terminal C of the D-FF 40 of the temperature data change determining circuit 12.

As will be described hereinafter, the comparing circuit 8 generates three types of first coincidence signals S3 under three types of conditions. Namely, as shown in FIG. 4, after the maximum temperature data holding device 20 is initialized by the reset signal ør, the counting operation of the count signal øc is started in accordance with the sampling signal øs. There are three conditions represented by Dt>Dm, Dt=Dm, and Dt<Dm between temperature data Dt of the frequency dividers 6a to 6c for the higher three digits of the temperature measuring circuit 6 and latching data Dm of the latch circuits 7a to 7c for the higher three digits of the data storage circuit 7. Waveforms of the first coincidence signal S3 under the respective conditions are shown by (C), (D), and (E) of FIG. 4.

Figure 4:
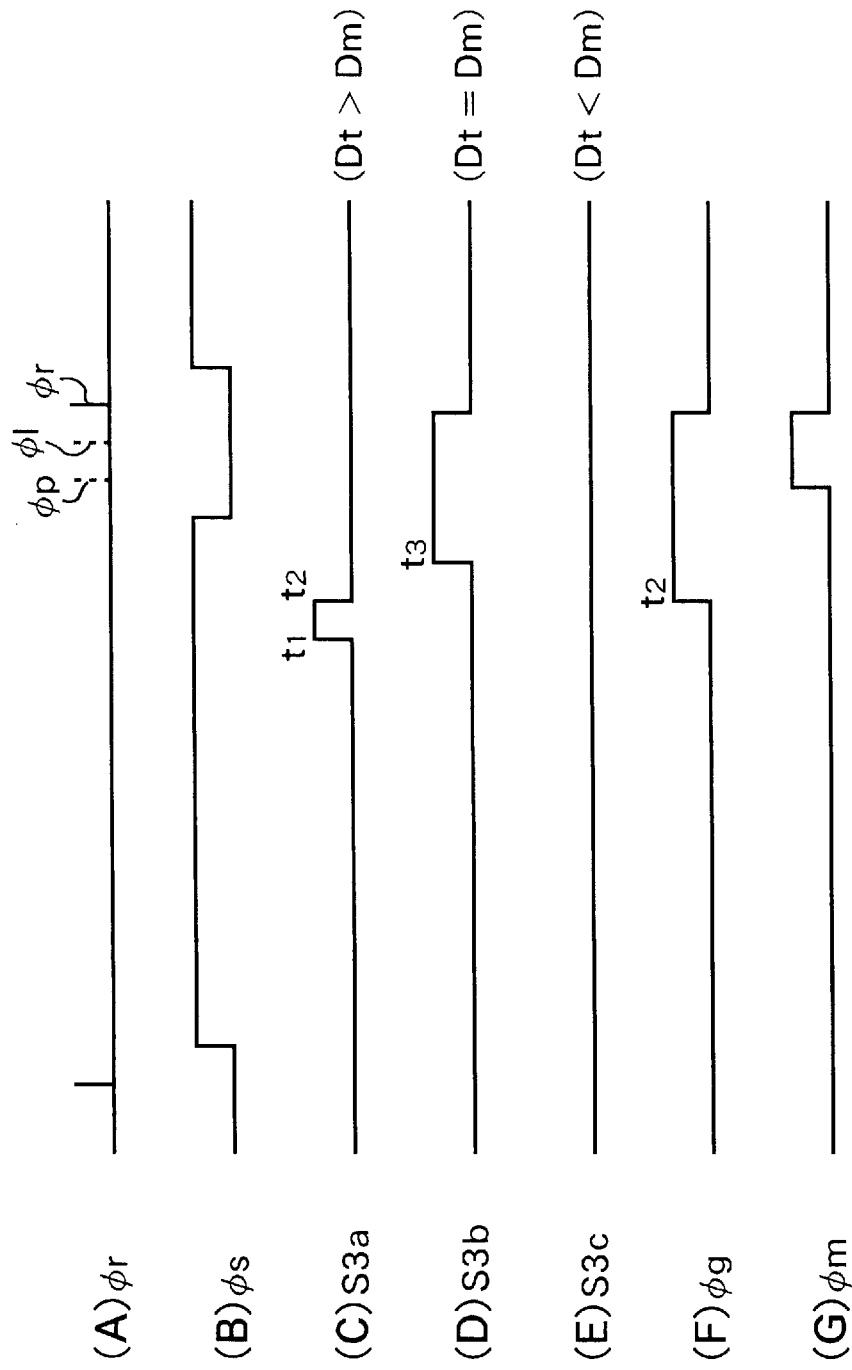
FIG. 4 is a diagram showing waveforms of main parts of the elements of FIG. 3.

Describing a coincidence signal S3a under the condition Dt>Dm, as shown by (C) of FIG. 4, the coincidence signal S3a once becomes a high level (positive-going) due to an equal condition of Dt=Dm at a timing t1 during the interval of the sampling signal øs. As the counting value of the temperature measuring circuit 6 is increased, the condition becomes Dt>Dm at a timing t2 (in the embodiment, Dt−Dm<0.1° C.). Thus, the equality is dissolved, and the coincidence signal S3a becomes a low level (negative-going). Under this state, the sampling signal øs is turned off.

In an coincidence signal S3b under the condition of Dt=Dm, as shown by (D) of FIG. 4, the coincidence signal S3b is positive-going due to an equal condition of Dt=Dm at a timing t3 during the interval of the sampling signal øs. However, the condition does not become unequal during the interval of the sampling signal øs. The coincidence signal S3b is kept at the high level. At the next reset signal ør, the coincidence signal becomes the low level.

Furthermore, in a coincidence signal S3c under the condition of Dt<Dm, as shown by (E) of FIG. 4, the condition does not become the equal condition of Dt=Dm during the interval of the sampling signal øs so that the coincidence signal does not become positive-going.

Three types of modes of the first coincidence signal S3 are described. Describing a meaning of each mode, the coincidence signal S3a shown by (C) of FIG. 4 means the fact that there is a coincidence in the comparator 8c for the unit digit of 0.1 degree, and the coincidence breaks thereafter. Hence, there is the condition of Dt−Dm>0.1 which continues after the signal. It means that the temperature rises 0.1° C. or more. In the coincidence signal S3b shown by (D) of FIG. 4, the coincidence in the comparator 8c is held during the sampling period. Namely, there is the condition of Dt=Dm or Dt−Dm<0.1. It means that the temperature does not rise or rises less than 0.1° C. (rise in the comparator 8d). Furthermore, in the coincidence signal S3c shown by (E) of FIG. 4, the coincidence does not occur in the comparator 8c. Thus, there is the condition of Dt<Dm. It means that the temperature decreases. Namely, the sensing head of the electronic clinical thermometer is removed from the measuring position.

The operation of the temperature data change determining circuit 12 corresponding to each of the coincidence signal S3 will be described. After the D-FF 40 is reset by the reset signal ør, in the condition that the sampling signal øs applied to the terminal D is in the "H" level, when the coincidence signal S3 applied to the terminal C becomes the low level, an output signal øg of "H" level ((F) of FIG. 4) is generated from an output terminal Q. Studying the conditions of the coincidence signals S3a to S3c, only the coincidence signal S3a becomes the low level in existence of the sampling signal øs. Consequently, when the coincidence signal S3a is applied to the terminal C of the D-FF 40, the output signal øg of "H" level is generated from the output terminal Q of the D-FF 40 at the timing t2 of the negative-going. However, if the coincidence signal S3b is applied to the terminal C, since the waveform is not negative-going, the output signal øg is not generated.

Consequently, in the operation of the temperature data change determining circuit 12, only when the maximum temperature data holding device 20 generates the coincidence signal S3a as the first coincidence signal, the D-FF 40 generates the output signal øg to open the AND gate 41, so that the lead signal øp passed through the AND gate 40 is applied to the RS-FF 42 to set it. Thus, a temperature data change determining signal øm shown by (G) of FIG. 4 is generated from an output terminal Q. Namely, the temperature data change determining circuit 12 generates the temperature data change determining signal øm when the condition becomes Dt−Dm<0.1 in the maximum temperature data holding device 20, namely only when the temperature rises 0.1° C.

A warning operation of the electronic clinical thermometer of FIG. 1 will be described with reference to waveforms of FIG. 5. As aforementioned, when the temperature measurement is started, the maximum temperature data holding device 20 measures the temperature data signal Dt and updates the maximum value Dm at every sampling signal øs shown by (A) of FIG. 5, and produces the first and second coincidence signals S3 and S4 in accordance with respective conditions. In an interval T1 of a waveform shown by (D) of FIG. 5, immediately after the start of the temperature measurement, the temperature on the display largely rises. Thus, the first coincidence signal S3 is generated at every sampling signal, and the temperature data change determining signal øm is generated every time from the temperature data change determining circuit 12. The AND gate 16 is opened by the temperature data change determining signal øm and the temperature data change trigger signal øm1 based on the latch signal øl passed through the AND gate 16 is applied to the first sound signal forming circuit 17. The output of the OR gate 18 is applied to the buzzer 103 through the buzzer driving circuit 19 for producing temperature change informing sound every time. In the interval T1, the temperature rise determining circuit 10 generates the temperature rise signal øn since the condition of Dt>Dm exists every time, so that the maximum value Dm is updated every time. However, in the condition, the stability detecting circuit 11 does not generate the stability detecting signal øe.

As the temperature on the display approaches a stability temperature, the temperature rise inclination becomes gradually gentle. Therefore, the first coincidence signal S3 is not generated every time from the maximum temperature data holding device 20. In an interval T2 of the waveform (D) of FIG. 5, the temperature data change informing signal øb1 generates every two sampling signals. In an interval T3, the coincidence signal is generated every three time. As the time passes, a generating period of the coincidence signal is elongated. As a result, the temperature data change trigger signal øm1 and the temperature data. change informing signal øb1 which synchronize with the temperature data change determining signal øm are changed to be generated every time in the interval T1, every two times in the interval T2, and every three times in the interval T3 as shown by (C), (D) of FIG. 5. Thus, the generating period of the temperature change informing sound from the buzzer 103 becomes long. Thereafter, as the time passes, the temperature rise inclination reduces. When the temperature finally becomes a constant temperature without inclination, the stability detecting circuit 11 generates the stability detecting signal øe. The AND gate 14 is opened by the stability detecting signal øe, and the stability trigger signal øe1 based on the latch signal øl passing through the AND gate 14 is applied to the second sound signal forming circuit 15. The output signal øbe of the sound signal forming circuit 15 is applied to the buzzer driving circuit 19 passing through the OR gate 18. The buzzer 103 is operated by the output signal of the buzzer driving circuit 19 for producing a stability informing sound which is different from the temperature change informing sound. Thus, the end of the measuring operation is informed.

Figure 5:
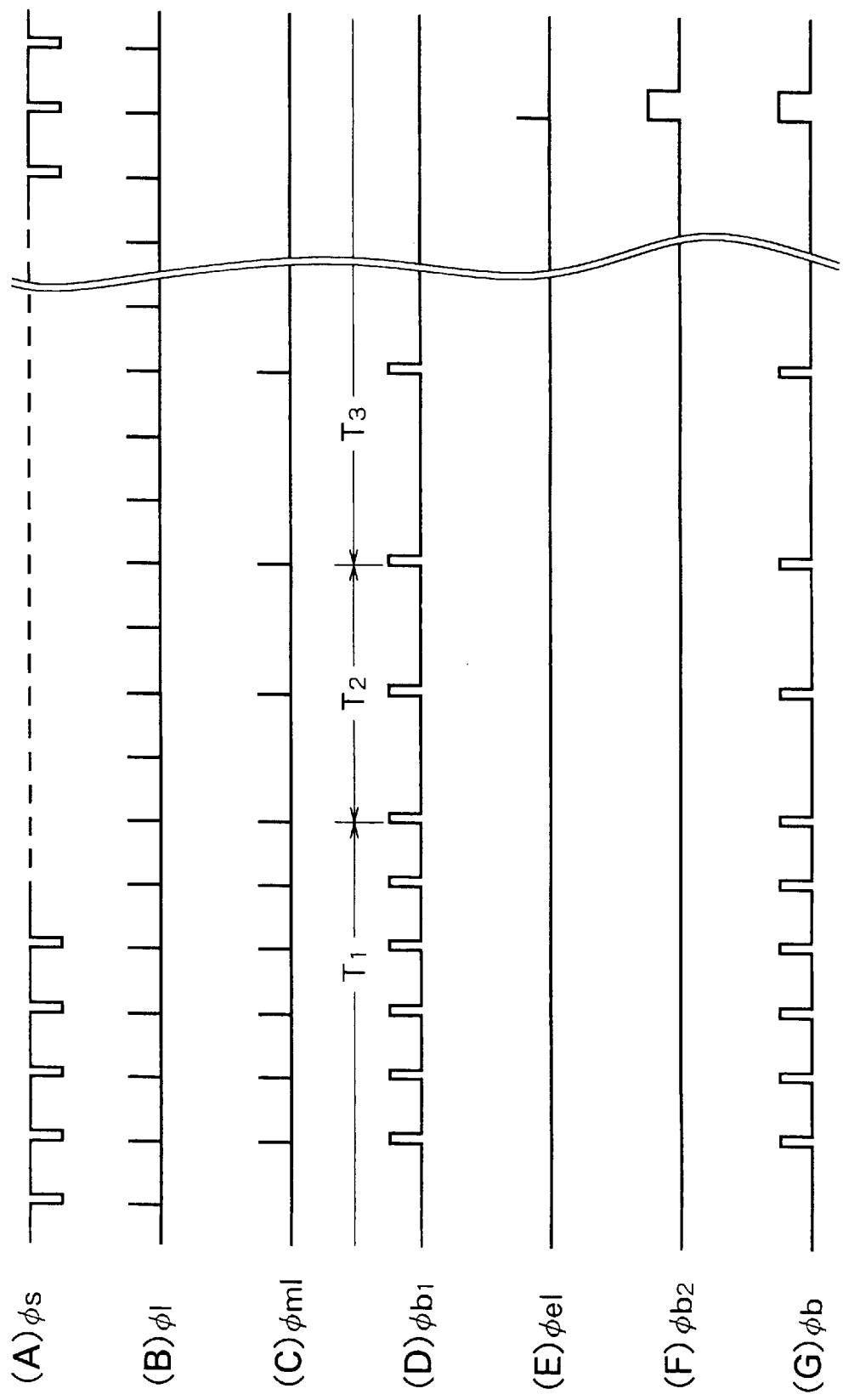
FIG. 5 is a diagram showing waveforms of main parts of the electronic clinical thermometer of FIG. 1.

In the informing sound generating operation in the sequential operation of the temperature measurement, as the informing signal øb shown by (G) of FIG. 5, in the interval T1 from the start of the measurement, the temperature change informing sound is generated by the temperature change informing signal øb1 every sampling signal øs which determines the measuring period. In the intervals T2 and T3 as the temperature inclination is gentle, the generating period of the temperature change informing sound becomes small at a period of integer time as much as the period of the sampling signal øs. As the temperature is stabilized, the stability informing sound is generated by the stability signal øb2 so that the end of the temperature measurement is informed.

Figure 6:
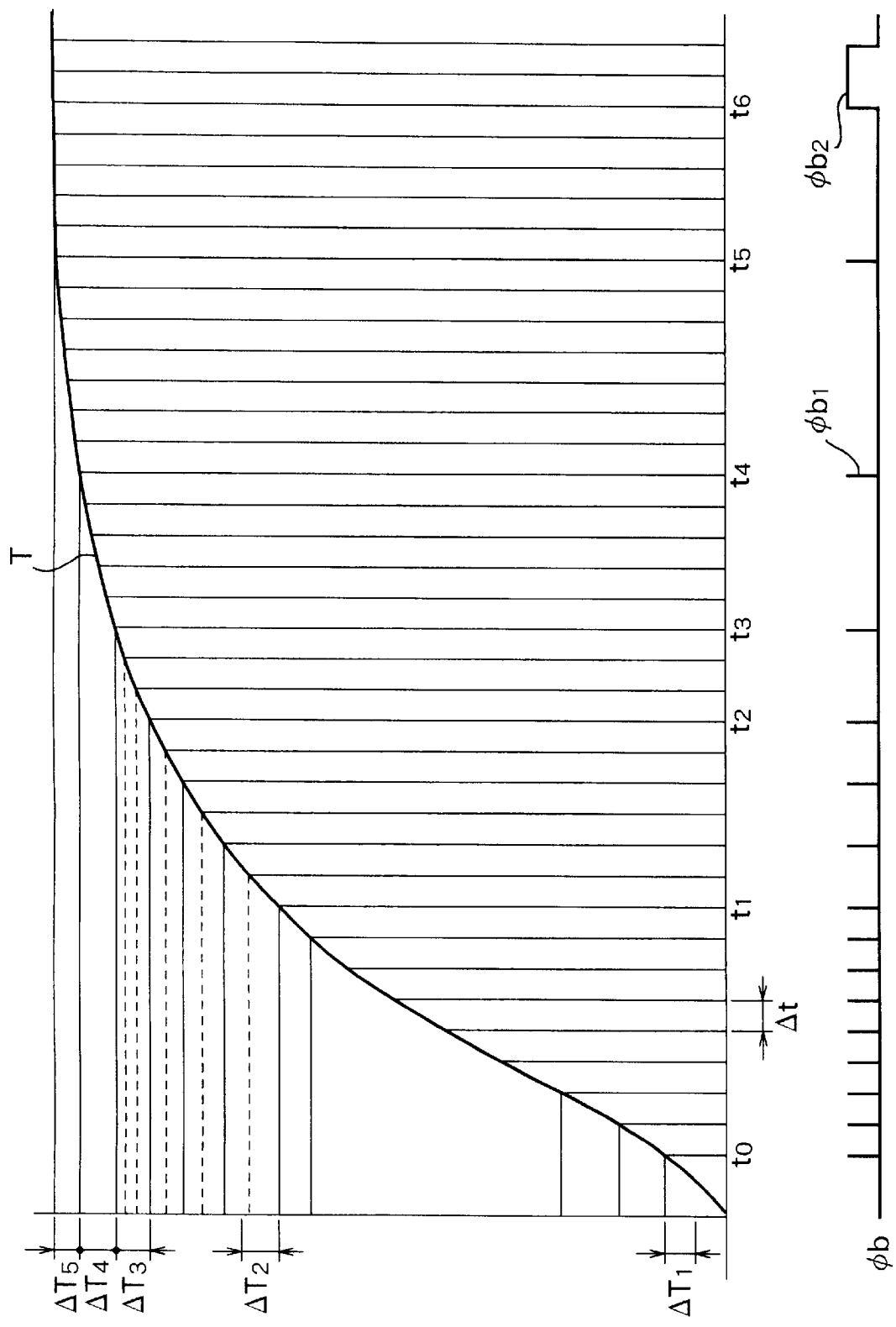
FIG. 6 is a diagram showing characteristics of a displayed temperature information rising curve and an informing characteristic of the electronic clinical thermometer.

FIG. 6 shows characteristics of a temperature rising curve and an informing sound generating state corresponding to the temperature rise. The abscissa designates the sampling period Δt and the ordinate designates the temperature rising value ΔT measured at every sampling period Δt. In the embodiment, a constant temperature rising value ΔT is 0.1° C. as aforementioned. At the temperature rising value ΔT, the temperature data change determining signal øm is generated from the temperature data change determining circuit 12. A relationship between temperature measuring operation and informing sound generating operation will be described. As well known, in a temperature rising curve T, the temperature rapidly rises immediately after the start of measurement, thereafter slowly rises as the time passes, and is finally stabilized. Therefore, between t0 at the start and t1, the temperature rises the value ΔT or more at every sampling as shown by a value ΔT1. As the informing signal øb, the temperature data change informing signal øb1 is generated at every sampling.

In the period where temperature is slowly rises between t1 and t2, the temperature does not rise the value ΔT at one sampling as shown by a value ΔT2. The temperature rises in excess of the value ΔT in the two periods of sampling. The temperature data change informing signal øb1 is generated every two times of sampling. Similarly, between t2 and t3 where the temperature further slowly rises, the temperature data change informing signal øb1 is generated every three times of sampling as shown by a value ΔT3. Between t3 and t4, the temperature data change informing signal øb1 is generated every five times of sampling as shown by a value ΔT4. Between t4 and t5, the temperature data change informing signal øb1 is generated every seven times of sampling as shown by a value ΔT5. Between t5 and t6 where the temperature is stabilized, the stability detecting circuit 11 detects that the first and second coincidence signals S3 and S4 are in a coincident state at the same time and the coincident state continues for five times. Thus, the detecting signal øb2 is generated at the timing t6 in which a stability detecting signal øe is generated.

There is a relativity between the informing sound period of the buzzer and the temperature stability that as above mentioned, immediately after the start of temperature measurement, the informing period of the buzzer is short so that the sound is produced at every measuring period, and that as the time passes, the informing period of the buzzer is gradually elongated. It is possible for the user to recognize the temperature measuring process and the end of the measurement by the buzzer information. In the embodiment, although ΔT=0.1° C. is set, the grade of the detection of the temperature rise can be freely set. An optional temperature rising value can be determined by selecting one of the comparators 8a to 8c which generate the first coincidence signal S3. If the sensing head of the electronic clinical thermometer is deviated from the measuring place, the buzzer is not driven. Thus, the fact that the buzzer does not emit sound informs the user that the deflection of the sensing head is deviated from the measuring place.

Probability of Industrial Exploitation

In accordance with the present invention, it is possible to provide an electronic clinical thermometer which informs not only the end of the measurement, but also the process of the measurement by the informing sound. The electronic clinical thermometer is extremely easy for the user to use, and may exactly measure the temperature. Furthermore, the temperature rising value is set by using the higher digit coincidence signal in the comparator, whereby the structure is simplified without increasing the manufacturing cost.

We claim:

1. An electronic clinical thermometer comprising a temperature sensing portion, a control signal generating circuit for generating a control signal for controlling operation of each of structural elements, a converting circuit for converting an output signal generated from said temperature sensing portion into a digital signal, a temperature measuring section for measuring the temperature based on said digital signal, storage circuits for storing and updating a maximum value of the temperature measured by the temperature measuring section in order, a display for displaying the temperature stored in said storage circuits, data comparing circuits for comparing the temperature stored in said storage circuits with a present measured value, temperature rise detecting means for detecting a rising amount of the temperature based on a compared result of said data comparing circuits, a buzzer driving circuit operated based on a signal of said temperature rise detecting means, informing means operated by the buzzer driving circuit for informing the rise of the temperature by generating an informing sound, wherein said temperature rise detecting means has a temperature change determining circuit for generating a temperature change determining signal responsive to a coincidence signal which is produced from the data comparing circuits during the measuring of temperature at the temperature measuring section, whereby the buzzer driving circuit operates to change a period of said informing sound in accordance with the temperature change.

2. The electronic clinical thermometer according to claim 1 wherein the temperature change determining circuit generates the determining signal when a predetermined constant rise of the temperature is detected.

3. The electronic clinical thermometer according to claim 1 wherein the control signal generating circuit generates a sampling signal for setting an operating period of the structural elements.

4. The electronic clinical thermometer according to claim 1 wherein the temperature measuring section has counter circuits for measuring the temperature by counting the digital signal.

5. The electronic clinical thermometer according to claim 4 wherein the counter circuits generate a counted result at the predetermined operating period set by the sampling signal.

6. The electronic clinical thermometer according to claim 5 wherein the counter circuits comprise four digits frequency dividers connected in series.

7. The electronic clinical thermometer according to claim 6 wherein the four digits frequency dividers comprise a unit of 10 degrees, a unit of 1 degrees, a unit of 0.1 degrees, and a unit of 0.01 degrees from a higher digit to a lower digit.

8. The electronic clinical thermometer according to claim 6 wherein the comparing circuits have a first comparing section for comparing higher digits of frequency dividers connected in series for forming the counter circuits and for generating a first coincidence signal, and a second comparing section for comparing a lower digit of a frequency divider and for generating a second coincidence signal.

9. The electronic clinical thermometer according to claim 7 wherein the comparing circuits have a first comparing section for comparing higher digits of frequency dividers connected in series for forming the counter circuits and for generating a first coincidence signal, and a second comparing section for comparing a lower digit of a frequency divider and for generating a second coincidence signal.

10. The electronic clinical thermometer according to claim 8 wherein the second comparing section is a comparator for comparing the coincidence of the frequency divider of the unit of 0.01 degrees, and the first comparing section comprises a comparing section for comparing the coincidence of frequency dividers of units of 0.1 degrees, 1 degrees and 10 degrees.

11. The electronic clinical thermometer according to claim 8 wherein the temperature change determining circuit is applied with the first coincidence signal from the first comparing section for generating the temperature change determining signal.

12. The electronic clinical thermometer according to claim 9 wherein the temperature change determining circuit is applied with the first coincidence signal from the first comparing section for generating the temperature change determining signal.

13. The electronic clinical thermometer according to claim 10 wherein the temperature change determining circuit is applied with the first coincidence signal from the first comparing section for generating the temperature change determining signal.

14. The electronic clinical thermometer according to claim 10 wherein the temperature rise detecting means includes stability detecting means, the stability detecting means generates a stability signal when the first coincidence signal does not become a low level after the first coincidence signal has become a high level during the counting operation of the temperature measuring section.

15. The electronic clinical thermometer according to claim 11 wherein the temperature change determining circuit generates the temperature change determining signal when the first coincidence signal becomes a low level after the first coincidence signal has become a high level during the counting operation of the temperature measuring section.

16. The electronic clinical thermometer according to claim 14 wherein the buzzer driving circuit is formed such that the informing means is operated to generate a different sound in dependency on the temperature change determining signal and the stability signal.

17. The electronic clinical thermometer according to claim 15 wherein the temperature change determining circuit has condition determining means for detecting the lowering of the first coincidence signal during the existence of the sampling signal generated from the control signal generating circuit.

18. The electronic clinical thermometer according to claim 17 wherein the condition determining means is a determining circuit using the sampling signal as a data signal and the first coincidence signal as a writing signal.

\* \* \* \* \*